United States Patent
Castro

(10) Patent No.: US 9,638,168 B2
(45) Date of Patent: May 2, 2017

(54) SYSTEM AND METHOD FOR DETECTING ICE ON A WIND TURBINE ROTOR BLADE

(71) Applicant: General Electric Company, Schenectady, NY (US)

(72) Inventor: Jorge Gonzalez Castro, Osnabrueck (DE)

(73) Assignee: General Electric Company, Schenectady, NY (US)

(*) Notice: Subject to any disclaimer, the term of this patent is extended or adjusted under 35 U.S.C. 154(b) by 982 days.

(21) Appl. No.: 13/860,783

(22) Filed: Apr. 11, 2013

(65) Prior Publication Data
US 2014/0308122 A1 Oct. 16, 2014

(51) Int. Cl.
*F01D 5/00* (2006.01)
*F03D 7/00* (2006.01)
*F03D 7/02* (2006.01)
*F03D 80/40* (2016.01)

(52) U.S. Cl.
CPC .......... *F03D 7/0224* (2013.01); *F03D 80/40* (2016.05); *F05B 2270/328* (2013.01); *Y02E 10/723* (2013.01)

(58) Field of Classification Search
CPC .... F03D 11/0025; F03D 7/0224; F03D 80/40; F05B 2270/328; Y02E 10/722; Y02E 10/723
See application file for complete search history.

(56) References Cited

U.S. PATENT DOCUMENTS

| 7,086,834 | B2 | 8/2006 | LeMieux |
| 7,677,075 | B2* | 3/2010 | Nies .................... F03D 11/0091 |
| | | | 73/1.01 |
| 8,641,376 | B2* | 2/2014 | Baba .................. F03D 11/0025 |
| | | | 416/39 |
| 2005/0276696 | A1 | 12/2005 | LeMieux |
| 2006/0034692 | A1 | 2/2006 | Grabau |
| 2009/0246019 | A1 | 10/2009 | Volanthen et al. |

(Continued)

FOREIGN PATENT DOCUMENTS

| EP | 2 469 080 A1 | 6/2012 |
| EP | 2 549 454 A2 | 1/2013 |

(Continued)

OTHER PUBLICATIONS

International Search Report and Written Opinion issued in connection with corresponding PCT Application No. PCT/US2014/031190 on Jun. 30, 2014.

(Continued)

*Primary Examiner* — Thai Ba Trieu
*Assistant Examiner* — Diem Tran
(74) *Attorney, Agent, or Firm* — Dority & Manning, P.A.

(57) ABSTRACT

A system and method for detecting ice on a rotor blade of a wind turbine are disclosed. In one embodiment, the method may include releasing a pitch brake of a pitch adjustment mechanism associated with the rotor blade, controlling the pitch adjustment mechanism so as to maintain the rotor blade at a fixed pitch angle, monitoring a pitch-related parameter of the wind turbine while the rotor blade is maintained at the fixed pitch angle, and analyzing the monitored pitch-related parameter to determine whether ice is present on the rotor blade.

16 Claims, 5 Drawing Sheets

(56) References Cited

U.S. PATENT DOCUMENTS

| | | | |
|---|---|---|---|
| 2011/0182732 A1* | 7/2011 | Baba | F01D 11/00 |
| | | | 416/39 |
| 2012/0024053 A1* | 2/2012 | Cheng | F03D 11/0025 |
| | | | 73/170.26 |
| 2012/0161446 A1 | 6/2012 | McNeill et al. | |
| 2012/0175878 A1 | 7/2012 | Wickstrom | |
| 2012/0207589 A1 | 8/2012 | Fridthjof | |
| 2012/0226485 A1 | 9/2012 | Creagh et al. | |

FOREIGN PATENT DOCUMENTS

| | | |
|---|---|---|
| KR | 20130023525 A | 3/2013 |
| WO | 2012/000509 A2 | 1/2012 |

OTHER PUBLICATIONS

U.S. Appl. No. 13/188,698, filed Jul. 22, 2011.

\* cited by examiner

SYSTEM AND METHOD FOR DETECTING ICE ON A WIND TURBINE ROTOR BLADE

FIELD OF THE INVENTION

The present subject matter relates generally to wind turbines and, more particularly, to a system and method for detecting ice on a wind turbine rotor blade.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Under some atmospheric conditions, ice may be buildup or otherwise accumulate on the rotor blades of a wind turbine. As the ice layer accumulating on a rotor blade becomes increasingly thicker, the aerodynamic surface of the blade is modified, thereby resulting in diminished aerodynamic performance. Moreover, ice accumulation significantly increases the weight of a rotor blade, which can lead to structural damage as an increased amount of bending moments and/or other rotational forces act on the rotor blade. In addition, when there is a differential in the amount of ice accumulating on each of the rotor blades, a mass imbalance may occur that can cause significant damage to a wind turbine.

Due to the disadvantages associated with ice accumulation, a wind turbine may be shutdown when it is believed that ice has accumulated on the surface of one or more of the rotor blades. Operation of the wind turbine may then be restarted after it can be verified that ice is no longer present on the rotor blades. Accordingly, upon shutdown of a wind turbine for ice accumulation, each rotor blade must be inspected to determine whether ice is actually and/or is still present on the blades. Conventionally, this requires that each blade be visually inspected from a location on the ground. However, due to the risk of falling ice, the service worker(s) performing the visual inspection must be located a safe distance away from the wind turbine. As such, it is often difficult to visually detect ice accumulation on the rotor blades. Moreover, such a visual inspection of the rotor blade blades typically takes a significant amount of time, which may unnecessarily increase that amount of time that a wind turbine is shutdown to check for ice accumulations.

Accordingly, a system and method that allows for the accurate and efficient detection of ice on a wind turbine rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting ice on a rotor blade of a wind turbine. The method may generally include releasing a pitch brake of a pitch adjustment mechanism associated with the rotor blade, controlling the pitch adjustment mechanism so as to maintain the rotor blade at a fixed pitch angle, monitoring a pitch-related parameter of the wind turbine while the rotor blade is maintained at the fixed pitch angle, and analyzing the monitored pitch-related parameter to determine whether ice is present on the rotor blade.

In another aspect, the present subject matter is directed to a system for detecting ice on a rotor blade of a wind turbine. The system may generally include a pitch adjustment mechanism configured to pitch the rotor blade and a sensor configured to monitor a pitch-related parameter of the wind turbine as the rotor blade is pitched. In addition, the system may include a controller communicatively coupled to the pitch adjustment mechanism and the sensor. The controller may be configured to release the pitch brake and control the pitch adjustment mechanism so that the rotor blade is maintained at a fixed pitch angle. The controller may also be configured to receive signals from the sensor related to the pitch-related parameter and analyze the pitch-related parameter to determine if ice is present on the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
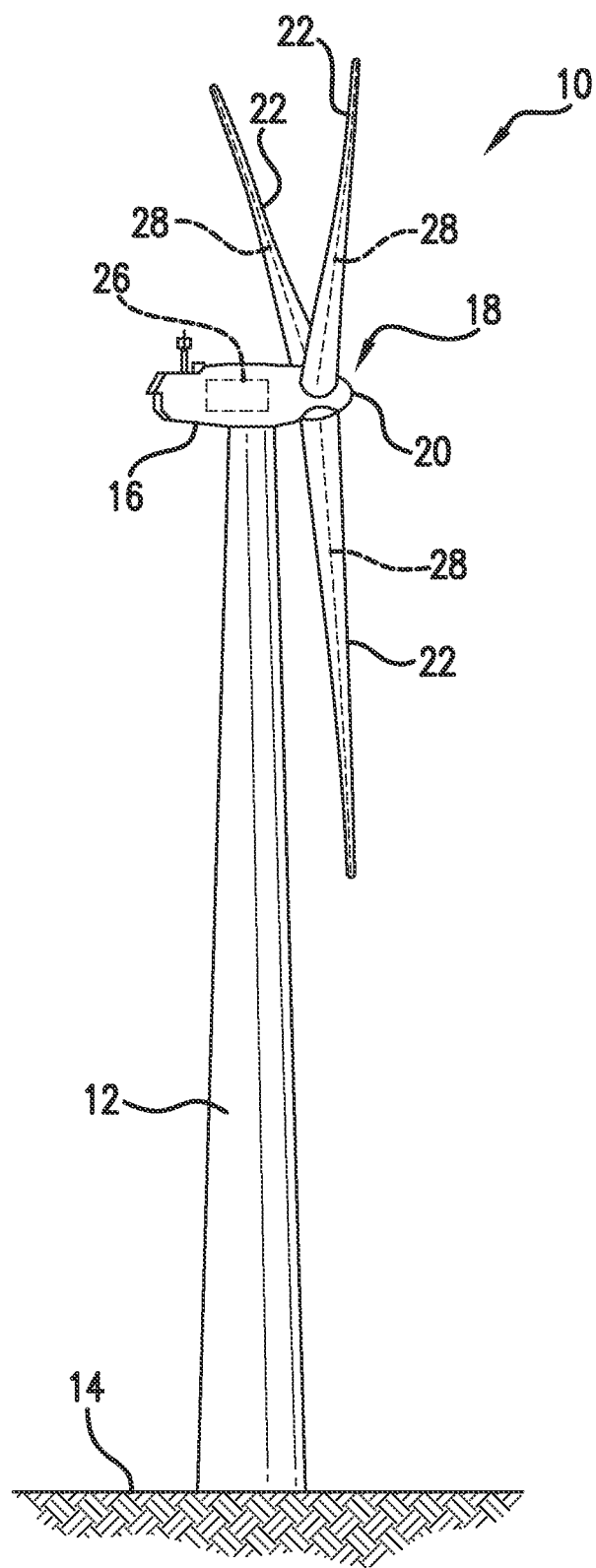
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting ice on a wind turbine rotor blade. Specifically, the disclosed system and method provide a means for detecting ice accumulations on a rotor blade while a wind turbine is not operating. For example, in several embodiments, upon shutdown of a wind turbine, the pitch brake of a pitch adjustment mechanism for a particular rotor blade may be released while the blade is in a non-vertical rotor position (i.e., at a rotor position between 0 degrees and 180 degrees and/or between 180 degrees and 360 degrees). The pitch adjustment mechanism may then be utilized to maintain the rotor blade at a fixed pitch angle while a pitch-related parameter of the wind turbine is monitored. The monitored pitch-related parameter may then be compared to predetermined or baseline data for such parameter in order to determine whether ice is present on the tested rotor blade.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. The turbine controller 26 may control the pitch angle of the rotor blades 22, either individually or simultaneously, by transmitting suitable control signals (via a pitch controller 29 (FIG. 2)) to one or more pitch drives or pitch adjustment mechanisms 30 (FIG. 2) of the wind turbine 10. During operation of the wind turbine 10, the controller 26 may generally control each pitch adjust mechanism 30 in order to alter the pitch angle of each rotor blade 22 between 0 degrees (i.e., a power position of the rotor blade 22) and 90 degrees (i.e., a feathered position of the rotor blade 22).

Figure 2:
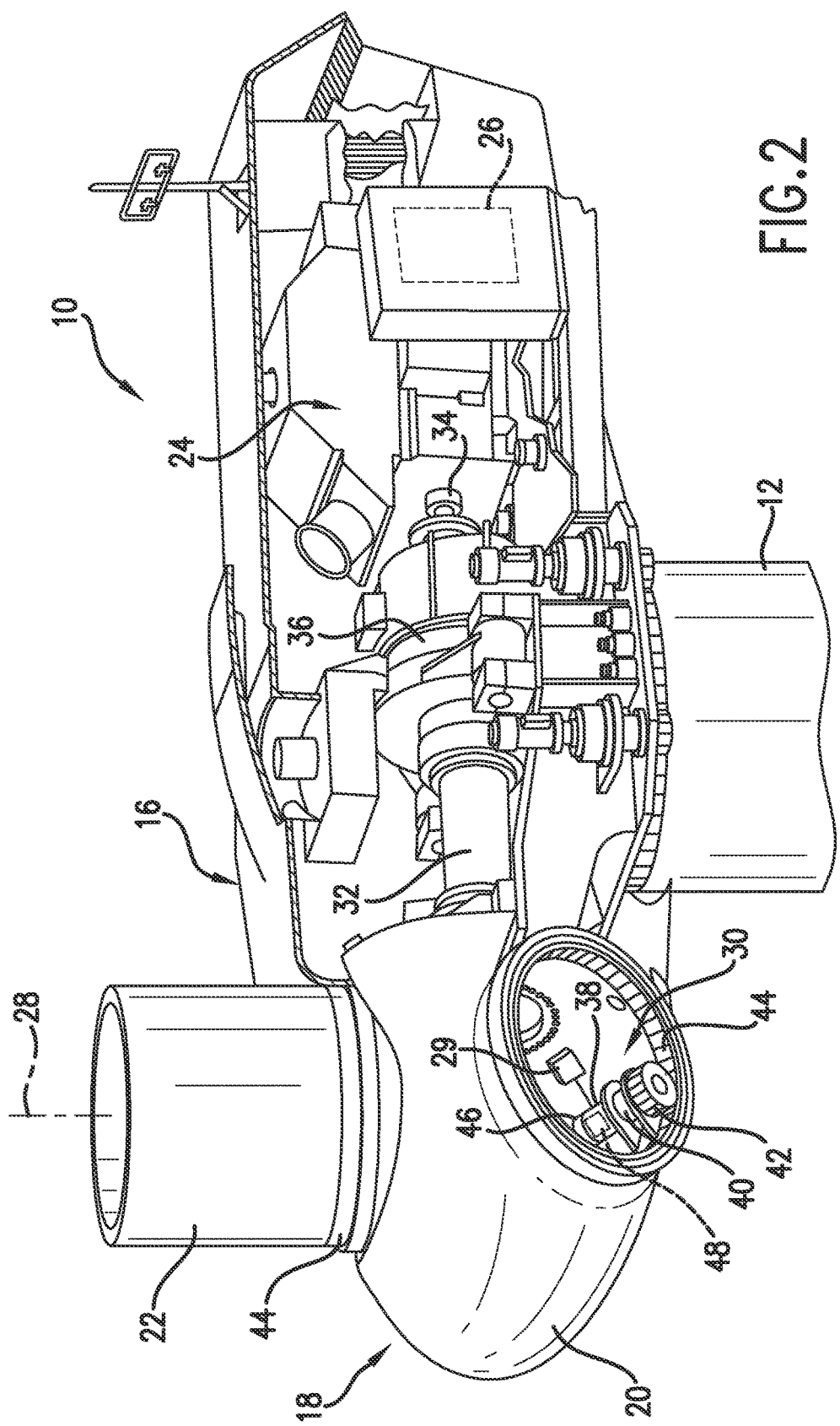
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive actuator 38, a pitch drive gearbox 40, and a pitch drive pinion 42. In such embodiments, the pitch drive actuator 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive actuator 38 drives the pitch drive gearbox 40 and the pitch drive pinion 42, thereby rotating the pitch bearing 44 and the rotor blade 22 about the pitch axis 28.

It should be appreciated that the pitch drive actuator 38 may generally comprise any suitable device capable of transferring rotational motion to the gearbox 40. For example, in several embodiments, the pitch drive actuator 38 may be an electric motor. In another embodiment, the pitch drive actuator 38 may be a hydraulic or pneumatic driven device (e.g., a hydraulic or pneumatic cylinder) configured to transmit rotational energy to the gearbox 40. In other embodiments, the pitch device actuator 38 may be another suitable device driven by any other suitable means (e.g., electro-chemical power, mechanical, etc.).

In addition, each pitch adjustment mechanism 30 may also include a pitch brake 46 configured to prevent rotation of one or more of the components of the pitch adjustment mechanism 30, thereby preventing the rotor blade 22 from being pitched. For example, as shown in the illustrated embodiment, the pitch brake 46 is coupled to the pitch drive actuator 38. Thus, when engaged, the pitch brake 46 may prevent the pitch drive actuator 38 from rotating, thereby maintaining the rotor blade 22 at a fixed pitch angle. However, when the pitch brake 46 is released, the pitch drive actuator 38 may be used to freely pitch the rotor blade 22. It should be appreciated that, in other embodiments, the pitch brake 46 may be coupled to any other suitable component of the pitch adjustment mechanism 30 that facilitates preventing the rotor blade 20 from being pitched when the brake 46 is applied.

It should also be appreciated that the pitch brake 46 may generally comprise any suitable braking device known in the art that may be used to prevent rotation of the rotor blade 22. For example, in several embodiments, the pitch brake 46 may be configured as a coil-engaged electromechanical brake. Thus, in one embodiment, when the electro-magnetic coil is energized, a brake pad or clamp (not shown) of the pitch brake 46 may be disengaged, thereby allowing the rotor blade 22 to be pitched about its pitch axis 28. Similarly, when the coil is not energized, the brake pad or clamp may be moved into engagement with a component of the pitch adjustment mechanism 30 (e.g., via a biasing element, such as a spring), thereby engaging the pitch brake 46 and preventing the rotor blade 22 from being pitched.

Additionally, as indicated above, the pitch adjustment mechanisms 30 may be configured to be electronically controlled by the controller 36 (e.g., via a separate pitch controller 29 communicatively coupled to the controller 26). For example, suitable control signals may be transmitted by the controller 26 instructing the pitch adjustment mechanisms 30 to pitch the rotor blades 22 across a given range of pitch angles. Similarly, suitable control signals may be transmitted by the controller 26 instructing the pitch adjustment mechanisms 30 to engage and/or release each pitch brake 46.

Referring still to FIG. 2, the wind turbine may also include a plurality of sensors 48 for monitoring one or more parameters and/or conditions of the wind turbine 10. As used herein, a parameter or condition of the wind turbine 10 is "monitored" when a sensor 48 is used to determine its present value. Thus, the term "monitor" and variations thereof are used to indicate that the sensors 48 need not provide a direct measurement of the parameter and/or condition being monitored. For example, the sensors 48 may be used to generate signals relating to the parameter and/or condition being monitored, which can then be utilized by the turbine controller 26 or other suitable device to determine the actual parameter and/or condition.

Thus, in several embodiments of the present subject matter, the wind turbine 10 may include one or more sensors 48 configured to monitor the amount of torque applied to each rotor blade 22 by its corresponding pitch adjustment mechanism 30. Specifically, in several embodiments, the wind turbine 10 may include one or more sensors 48 configured to transmit signals to the turbine controller 26 relating directly to the amount of torque generated by each pitch adjustment mechanism 30. For example, the sensor(s) 48 may comprise one or more torque sensors coupled to a portion of the pitch drive actuator 38, the pitch gearbox 40 and/or the pitch drive pinion 42 in order to monitor the torque generated by each pitch adjustment mechanism 30. Alternatively, the sensor(s) 48 may comprise one or more suitable sensors configured to transmit signals to the turbine controller 26 relating indirectly to the amount of torque generated by each pitch adjustment mechanism 30. For instance, in embodiments in which the pitch drive mechanism 30 is electrically driven, the sensor(s) 48 may comprise one or more current sensors configured to detect the electrical current supplied to the pitch drive actuator 38. Similarly, in embodiments in which the pitch adjustment mechanism 30 is hydraulically or pneumatically driven, the sensor(s) 48 may comprise one or more suitable pressure sensors configured to detect the pressure of the fluid within the hydraulically or pneumatically driven device. In such embodiments, the turbine controller 26 may generally include suitable computer-readable instructions (e.g., in the form of suitable equations, transfer functions, models and/or the like) that, when implemented, configure the controller 26 to correlate the current input or the pressure input to the torque generated by each pitch adjustment mechanism 30.

It should be appreciated that the wind turbine 10 may also include various other sensors for monitoring any other suitable parameters and/or conditions of the wind turbine 10. For example, the wind turbine 10 may include sensors for monitoring the pitch angle of each rotor blade 22, any bending moments on the rotor blades 22, the speed of the rotor 18 and/or the rotor shaft 32, the speed of the generator 24 and/or the generator shaft 34, the torque on the rotor shaft 32 and/or the generator shaft 34, the wind speed and/or wind direction and/or any other suitable parameters and/or conditions.

Figure 3:
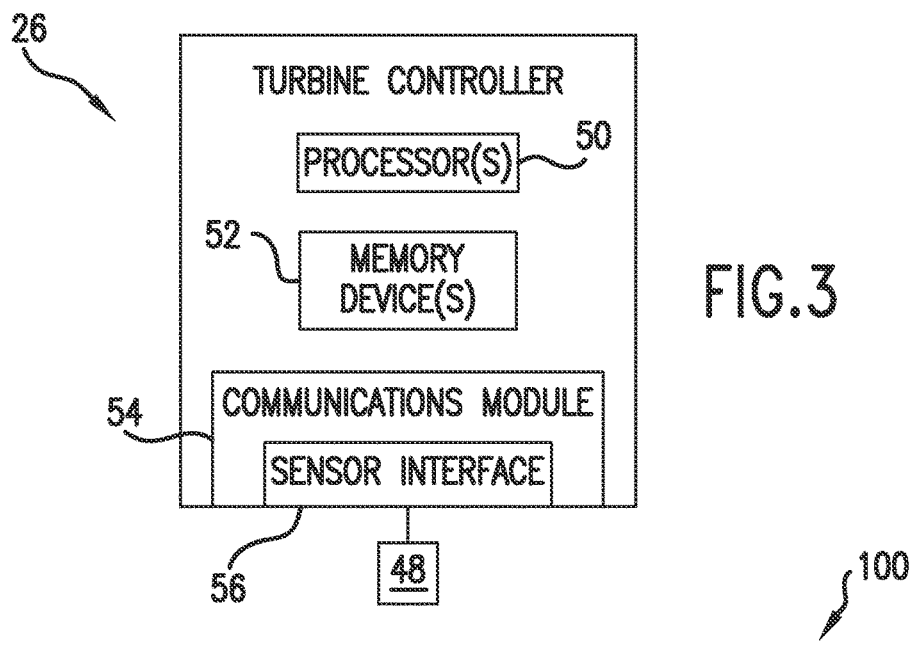
FIG. 3 illustrates a schematic diagram of one embodiment of suitable components that may be included within a turbine controller of a wind turbine.

Referring now to FIG. 3, there is illustrated a block diagram of one embodiment of suitable components that may be included within the turbine controller 26 (and/or the pitch controller 29) in accordance with aspects of the present subject matter. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 (e.g., via the pitch controller 29) for controlling the pitch angle of the rotor blades 22 and/or for controlling the operation of the pitch brake 46. Moreover, the communications module 54 may include a sensor interface 56 (e.g., one or more analog-to-digital converters) to permit signals transmitted from the sensor(s) 48 of the wind turbine 10 to be converted into signals that can be understood and processed by the processors 50.

It should be appreciated that the sensor(s) 48 may be communicatively coupled to the communications module 54 using any suitable means. For example, as shown in FIG. 3, the sensor(s) 48 is coupled to the sensor interface 56 via a wired connection. However, in other embodiments, the sensor(s) 48 may be coupled to the sensor interface 56 via a wireless connection, such as by using any suitable wireless communications protocol known in the art.

Figure 4:
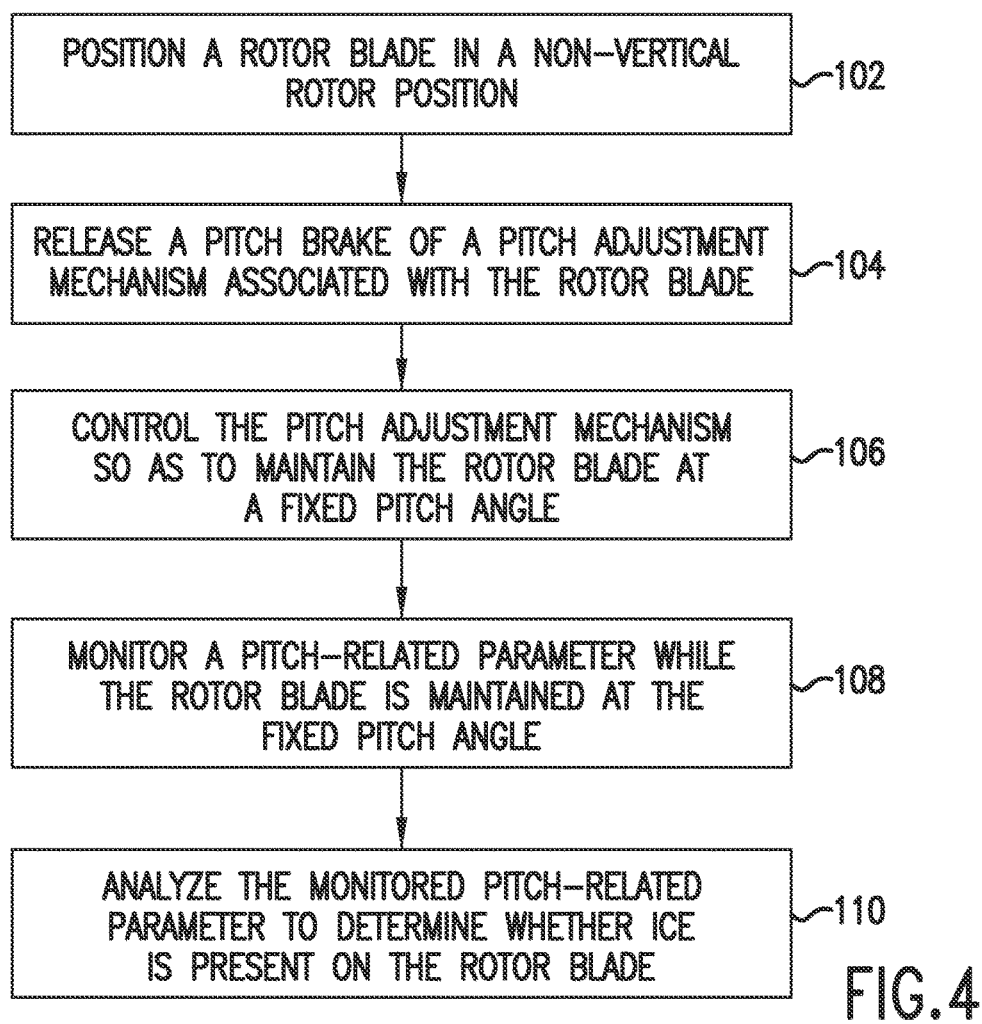
FIG. 4 illustrates a flow diagram of one embodiment of a method for detecting ice on a rotor blade of a wind turbine.

Referring now to FIG. 4, a flow diagram of one embodiment of a method 100 for detecting ice on a wind turbine rotor blade is illustrated in accordance with aspects of the present subject matter. As shown, the method 100 generally include positioning the rotor blade in a non-vertical rotor position 102, releasing a pitch brake of a pitch adjustment mechanism associated with the rotor blade 104, controlling the pitch adjustment mechanism so as to maintain the rotor blade at a fixed pitch angle 106, monitoring a pitch-related parameter of the wind turbine while the rotor blade is maintained at the fixed pitch angle 108 and analyzing the monitored pitch-related parameter to determine whether ice is present on the rotor blade 110.

In general, the disclosed method 100 provides a simple and accurate test for detecting ice accumulation on a rotor blade 22. Specifically, the disclosed method 100 provides a test for detecting ice accumulation on a rotor blade 22 while a wind turbine 10 is not operating (i.e., when the rotor 18 is not rotating). For example, as indicated above, wind turbines 10 are often shutdown when it is believed that ice is accumulating on one or more of the rotor blades 22 in order to prevent damage to the rotor blades 22 and/or to decrease the likelihood of damage/injury that may be caused by ice falling from the rotor blades 22. Moreover, when a wind turbine 10 is shutdown due to the belief or actual presence of ice accumulations on one or more of the rotor blades 22, operation of the wind turbine 10 is not typically restarted until it has been verified that ice is no longer present on the blade(s) 22. Accordingly, the disclosed method 100 may allow for the presence of ice to be quickly and accurately detected, thereby minimizing downtime of the wind turbine 10.

In several embodiments, it should be appreciated that the disclosed method 100 may be performed automatically by the turbine controller 26. For example, the turbine controller 26 may be provided with suitable computer-readable instructions that, when implemented, configure the controller 26 to transmit control signals to one of the pitch adjustment mechanisms 30 in order to release its pitch brake 46 and maintain the corresponding rotor blade 22 at a fixed pitch angle. Moreover, the turbine controller 26 may be configured to monitor a pitch-related parameter of the wind turbine 10 as the rotor blade 22 is maintained at the fixed pitch angle and, based on the pitch-related parameter, determine whether any ice has accumulated on the blades 22. For instance, the controller 26 may be configured to compare the monitored pitch-related parameter to baseline data previously obtained for such parameter in order to determine whether ice is present on the rotor blade(s) 22.

As shown in FIG. 4, at 102, one or more of the rotor blades 22 may be initially positioned at a non-vertical rotor position. As indicated above, the disclosed method 100 is generally designed as a non-operating ice detection test. Thus, in several embodiments, the wind turbine 10 may be initially shutdown prior to performing the disclosed method 100. For example, each of the rotor blades 22 may be pitched to the feathered position (i.e., a 90 degree pitch angle) in order to stop rotation of the rotor 18 and, thus, halt operation of the wind turbine 10.

Upon shutdown of the wind turbine 10, the rotor position of the rotor blade 22 to be tested may then be confirmed. If the rotor blade 22 is already positioned at a non-vertical rotor position, the remaining method elements (e.g., elements 104, 106, 108, 110) may be performed to check for ice. If not (or if the rotor blade 22 is not at a desired non-vertical rotor position), the rotor 18 may be rotated a given amount to move the rotor blade to a non-vertical rotor position (or to the desired non-vertical rotor position).

Figure 5:
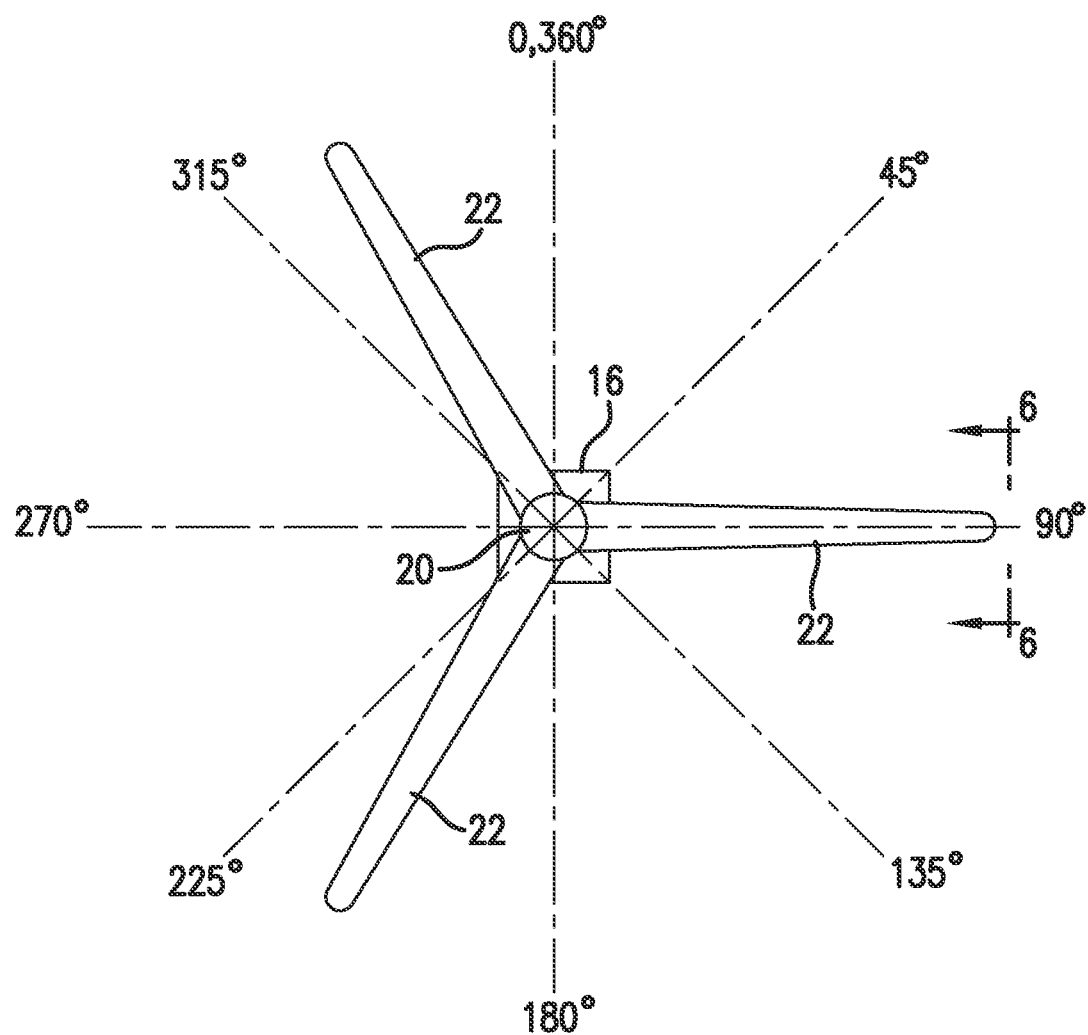
FIG. 5 illustrates a front view of a rotor of a wind turbine, particularly illustrating various rotor positions for the rotor blades; and, FIG. 6 illustrates a spanwise view of one of the rotor blades shown in FIG. 5 taken from the perspective of line 6-6.

It should be appreciated that, as used herein, the term "non-vertical rotor position" refers to a rotor position at which the pitch axis 28 of a rotor blade 22 is not completely vertically oriented. For example, FIG. 5 illustrates a front view of the rotor 18 of the wind turbine 10 shown in FIG. 1, particularly illustrating the various rotor positions for the rotor blades 22. As shown, the vertical rotor positions are defined at 0 degrees (or 360 degrees) and at 180 degrees. Thus, the term "non-vertical rotor position" refers to any rotor position ranging from greater than 0 degrees to less than 180 degrees and/or any rotor position ranging from greater than 180 degrees to less than 360 degrees.

In several embodiments, it may be desirable to position the rotor blades 22 at a non-vertical rotor position ranging from about 45 degrees to about 135 degrees and/or ranging from about 225 degrees to about 315 degrees when checking for ice accumulation on the blades 22. Specifically, when a rotor blade 22 is positioned closer to one of the horizontal rotor positions (i.e., at 90 degrees or at 270 degrees), the impact of gravity on the torsional force required to maintain the rotor blade 22 at a fixed pitch angle may be the most significant. As such, due to the increased weight resulting from ice accumulations, the presence of ice on the rotor blade 22 may be more easily and/or accurately detected.

Figure 6:
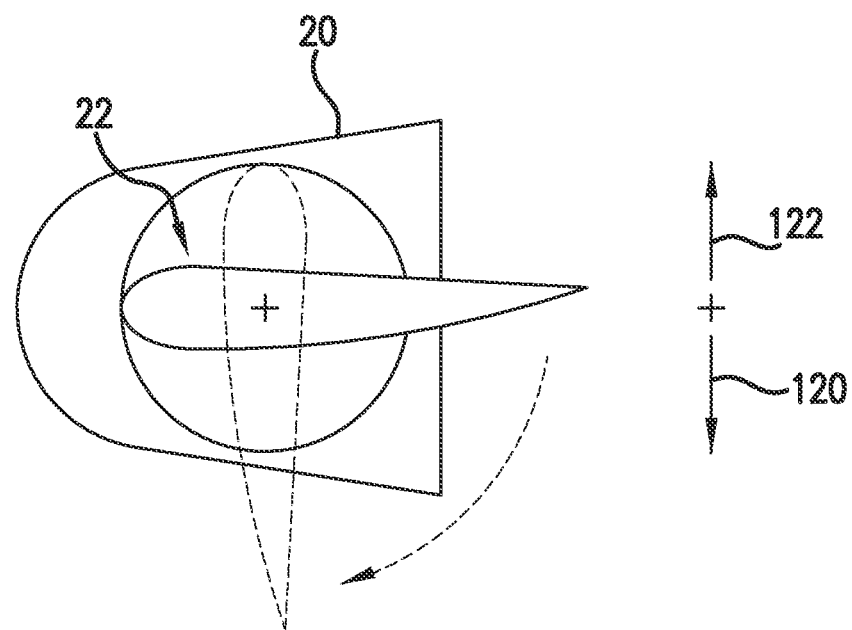

Referring still to FIG. 4, at 104 and 106, the pitch brake 46 of the pitch adjustment mechanism 30 associated with the rotor blade 22 may be released while the pitch adjustment mechanism 30 is controlled in a manner that maintains the rotor blade 22 at a fixed pitch angle. For example, FIG. 6 illustrates a simplified view of one of the rotor blades 22 shown in FIG. 5 (i.e., the rotor blade positioned at the 90 degree rotor position) taken from the view of line 6-6. As shown, due to the gravitational force acting on the rotor blade 22 (indicated by arrow 122), the rotor blade tends to rotate downward (e.g., to the position shown in the dashed lines) when the pitch brake 46 is released. Thus, to maintain the rotor blade 22 at a fixed pitch angle, an input to the pitch adjustment mechanism 30 may be regulated so that the torsional force applied to the rotor blade 22 via the mechanism 30 (indicated by arrow 122) counteracts the gravitational force.

It should be appreciated that the type of input being regulated may generally vary depending on the configuration of the pitch drive actuator 38. For example, if the pitch drive actuator 38 is an electric motor, the current supplied to the motor may be regulated in order to maintain the rotor blade 22 at the fixed pitch angle. Alternatively, if the pitch drive actuator 38 is pneumatically or hydraulically driven, the pressure of the fluid may be regulated in order to maintain the rotor blade 22 at the fixed pitch angle.

Additionally, at 108, a pitch-related parameter of the wind turbine 10 may be monitored while the rotor blade 22 is maintained at the fixed pitch angle. As used herein, the term "pitch-related parameter" generally refers to any parameter and/or condition of a wind turbine 10 that may vary while the rotor blade 22 is maintained at the fixed pitch angle depending on whether ice is present on the blade 22. For instance, in several embodiments, the pitch-related parameter may correspond to the amount of torque required to maintain the rotor blade 22 at the fixed pitch angle. Specifically, as indicated above, ice accumulation on a rotor blade 22 may increase its weight and may also alter its mass distribution. Thus, the torque required for a rotor blade 22 having no ice accumulation may generally vary from the torque for the same rotor blade 22 having ice accumulated thereon.

As indicated above, the torque may be monitored using one or more suitable sensors 46. For example, the torque generated by each pitch adjustment mechanism 30 may be monitored directly using torque sensors or indirectly using various other suitable sensors (e.g., current sensors and/or pressure sensors configured monitor the current input and/or pressure input to the pitch adjustment mechanism 30).

Referring still to FIG. 4, at 110, the monitored pitch-related parameter may be analyzed in order to determine whether ice is actually present on the rotor blade 22. Specifically, in several embodiments, the monitored pitch-related parameter may be compared to baseline data obtained for such parameter. Such baseline data may generally correspond to data associated with the anticipated or actual values for the pitch-related parameter being monitored assuming no ice is present on the rotor blade 22 being tested. For example, when the pitch-related parameter corresponds to the amount of torque, the baseline data may comprise a torque value(s) corresponding to the amount of torque required to maintain the rotor blade at the fixed pitch angle when no ice is present on the blade 22. Accordingly, variations from the baseline data may generally provide an indication of ice accumulations on the rotor blade 22.

Figure 7:
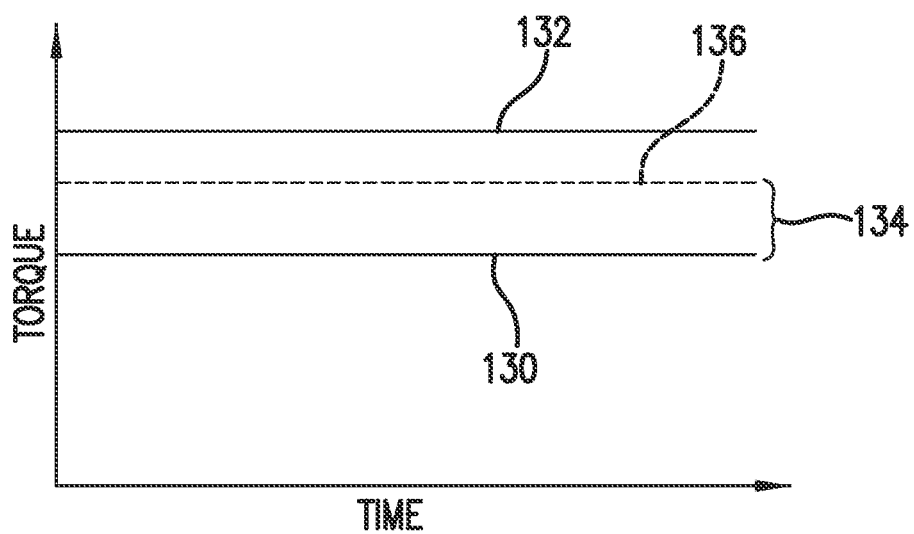
FIG. 7 illustrates a graph providing example data for the amount of torque required to maintain a rotor blade at a fixed pitch angle.

For example, FIG. 7 illustrates example data for the amount of torque required to maintain one of the rotor blades 22 at a fixed pitch angle over a given period of time. Specifically, FIG. 7 charts baseline data (line 130) corresponding to the torque required to maintain the rotor blade 22 at the fixed pitch angle when no ice is present on the blade 22. In addition, FIG. 7 charts new data (line 132) recently obtained for the rotor blade 22. As shown, the new data 132 varies from the baseline data 130 significantly, with the amount of torque required being much higher. As indicated above, such an increased torque requirement may generally be indicative of the increased blade weight resulting from ice accumulations on the rotor blade 22.

Additionally, in several embodiments, a predetermined tolerance or percent variation 134 may be incorporated into the baseline data 130 to accommodate slight deviations that may result from sensor inaccuracies, component wear, varying operating conditions and/or other factors that are not associated with ice accumulations on a rotor blade 22. For example, as shown in FIG. 7, a range of torque values may be defined between the baseline data 130 and line 136 that corresponds to an allowable percent variation 134 from the baseline data 130. Thus, as long as the monitored torque value for the rotor blade 22 remains within the area defined between the baseline data 130 and line 136, it may be assumed that no ice is present on the blade 22. However, if the monitored torque value exceeds the allowable percent variation 134, it may be assumed that ice has accumulated on the rotor blade 22 and operation of the wind turbine 10 may be delayed until it is determined that the ice is no longer present on the blade 22. For example, the turbine controller 26 may be configured to wait a predetermined amount of time and then re-perform the disclosed method 100 in order to determine if the ice previously detected has melted away or has otherwise been removed from the rotor blade 22.

It should be appreciated that, as described above, the allowable percent variation 134 may be selected so that it may be assumed that no ice is present on the blade 122 when the monitored torque value for the rotor blade 22 remains within the area defined between the baseline data 130 and line 136. Alternatively, the allowable percent variation 134 may be selected so that the monitored torque value for the rotor blade 22 remains within the area defined between the baseline data 130 and line 136 even when some ice is present on the blade 22. For instance, it may be desirable to select the allowable percent variation 134 so that the monitored torque value exceeds the allowable percent variation 134 only when a predetermined amount of ice is present on the blade 22.

It should also be appreciated that the allowable percent variation 134 from the baseline data 130 may generally vary based on numerous factors including, but not limited to, the configuration of the rotor blade, 22 the accuracy of any sensors 46 being utilized, the current operating conditions of the wind turbine 10 and/or the actual and/or anticipated wear on any relevant wind turbine components (e.g., the pitch bearing 44). However, it is well within the skill of one of ordinary skill in the art to determine a suitable percent variation 134 for the baseline data 130 based on the factors described above and/or any other suitable factors that may cause variations in the baseline data 130 and/or the pitch-related parameter being monitored.

Additionally, it should be appreciated that the baseline data for a particular pitch-related parameter may generally vary from wind turbine 10 to wind turbine 10 and/or from rotor blade 22 to rotor blade 22. Thus, in several embodiments, baseline data for the pitch-related parameter being monitored may be determined individually for each rotor blade 22. In general, the baseline data for the rotor blades 22 may be collected and/or obtained using any suitable means and/or method known in the art. For instance, in one embodiment, the baseline data for each rotor blade 22 may be determined experimentally, such as by maintaining the rotor blade at a fixed pitch angle when it is known that no ice is present on the blade 22 and monitoring the pitch-related parameter. In another embodiment, the baseline data for each rotor blade 22 may be modeled or determined mathematically, such as by calculating the data based on, for example, the configuration of each rotor blade 22, the specifications of each pitch adjustment mechanism 30 and/or the anticipated variation in the pitch-related parameter due to the presence of ice.

As indicated above, it should be appreciated that the present subject matter is also directed to a system for detecting ice on a wind turbine rotor blade 22. In several embodiments, the system may generally include a pitch adjustment mechanism 30 configured to pitch the rotor blade 22 and a sensor 48 configured to monitor a pitch-related parameter of the wind turbine 10. Additionally, the system may include a controller 26 communicatively coupled to the pitch adjustment mechanism 30 and the sensor 48. The controller may be configured to release a pitch brake of the pitch adjustment mechanism 30 and control the pitch adjustment mechanism 30 so that the rotor blade 22 is maintained at a fixed pitch angle. In addition, the controller 26 may be configured to receive signals from the sensor 38 associated with the pitch-related parameter and analyze the pitch-related parameter to determine if any ice is present on the rotor blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting ice on a rotor blade of a wind turbine, the method comprising:
    positioning the rotor blade at a fixed non-vertical rotor position while the wind turbine is not operating;
    releasing a pitch brake of a pitch adjustment mechanism associated with the rotor blade while the rotor blade is positioned at the fixed non-vertical rotor position;
    controlling the pitch adjustment mechanism so as to maintain the rotor blade at a fixed pitch angle against gravity while the rotor blade is positioned at the fixed non-vertical rotor position;
    monitoring a pitch-related parameter of the wind turbine while the rotor blade is maintained at the fixed pitch angle; and,
    analyzing the monitored pitch-related parameter to determine whether ice is present on the rotor blade.

2. The method of claim 1, wherein the fixed non-vertical rotor position ranges from about 45 degrees to about 135 degrees or from about 225 degrees to about 315 degrees.

3. The method of claim 1, wherein controlling the pitch adjustment mechanism so as to maintain the rotor blade at a fixed pitch angle comprises controlling an input to a pitch drive actuator of the pitch adjustment mechanism.

4. The method of claim 1, wherein monitoring a pitch-related parameter of the wind turbine comprises monitoring an amount of torque required to maintain the rotor blade at the fixed pitch angle.

5. The method of claim 4, wherein monitoring an amount of torque required to maintain the rotor blade at the fixed pitch angle comprises:
    monitoring a current input to a pitch drive actuator of the pitch adjustment mechanism; and,
    correlating the current input to the amount of torque required to maintain the rotor blade at the fixed pitch angle.

6. The method of claim 4, wherein monitoring an amount of torque required to maintain the rotor blade at the fixed pitch angle comprises:
    monitoring a pressure input to a pitch drive actuator of the pitch adjustment mechanism; and,
    correlating the pressure input to the amount of torque required to maintain the rotor blade at the fixed pitch angle.

7. The method of claim 1, wherein analyzing the monitored pitch-related parameter to determine whether ice exists on the rotor blade comprises comparing the monitored pitch-related parameter to baseline data for the pitch-related parameter.

8. The method of claim 6, wherein comparing the monitored pitch-related parameter to baseline data for the pitch-related parameter comprises determining whether the monitored pitch-related parameter falls outside a predetermined tolerance for the baseline data.

9. A system for detecting ice on a rotor blade of a wind turbine while the wind turbine is not operating and the rotor blade is positioned at a fixed non-vertical rotor position, the system comprising:
    a pitch adjustment mechanism configured to pitch the rotor blade, the pitch adjustment mechanism including a pitch brake;
    a sensor configured to monitor a pitch-related parameter of the wind turbine; and
    a controller communicatively coupled to the pitch adjustment mechanism and the sensor, the controller being configured to release the pitch brake and control the pitch adjustment mechanism so that the rotor blade is maintained at a fixed pitch angle against gravity while the rotor blade is positioned at the fixed no-vertical rotor position, the controller being further configured to receive signals from the sensor related to the pitch-related parameter while the rotor blade is positioned at the fixed non-vertical rotor position and analyze the pitch-related parameter to determine if ice is present on the rotor blade.

10. The system of claim 9, wherein the non-vertical rotor position ranges from about 45 degrees to about 135 degrees or from about 225 degrees to about 315 degrees.

11. The system of claim 9, wherein the pitch adjustment mechanism comprises a pitch drive actuator, the controller being configured to control an input to the pitch drive actuator in order to maintain the rotor blade at the fixed pitch angle.

12. The system of claim 9, wherein the pitch-related parameter comprises an amount of torque required to maintain the rotor blade at the fixed pitch angle.

13. The system of claim 12, wherein the sensor comprises a current sensor configured to monitor a current input to the pitch adjustment mechanism.

14. The system of claim 12, wherein the sensor comprises a pressure sensor configured to monitor a pressure input to the pitch adjustment mechanism.

15. The system of claim 9, wherein the controller is configured to compare the pitch-related parameter to baseline data for the pitch-related parameter to determine whether ice is present on the rotor blade.

16. The system of claim 15, wherein the controller is configured to determine whether the monitored pitch-related parameter falls outside a predetermined tolerance for the baseline data.

* * * * *